(12) United States Patent
Miura et al.

(10) Patent No.: US 7,267,901 B2
(45) Date of Patent: Sep. 11, 2007

(54) FUEL CELL SYSTEM

(75) Inventors: Shimpei Miura, Mishima (JP);
Shigeaki Murata, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 644 days.

(21) Appl. No.: 10/676,040

(22) Filed: Oct. 2, 2003

(65) Prior Publication Data
US 2004/0072050 A1 Apr. 15, 2004

(30) Foreign Application Priority Data
Oct. 11, 2002 (JP) ............................. 2002-298505

(51) Int. Cl.
*H01M 8/02* (2006.01)
(52) U.S. Cl. .......................................... 429/34; 429/38
(58) Field of Classification Search ...................... None
See application file for complete search history.

(56) References Cited
U.S. PATENT DOCUMENTS
2002/0159939 A1* 10/2002 Lieftink et al. .......... 423/242.1

2003/0126796 A1* 7/2003 Hibino et al. ................. 48/195

FOREIGN PATENT DOCUMENTS
DE         31 51 215 A1   12/1981
DE         102 97 729 T5   7/2005
JP         A 2002-29701    1/2002

* cited by examiner

*Primary Examiner*—John S. Maples
(74) *Attorney, Agent, or Firm*—Oliff & Berridge, PLC

(57) ABSTRACT

A fuel cell system comprises a fuel cell, a fuel gas passage through which a fuel gas containing an odorant and hydrogen gas supplied to the fuel cell flows, an oxidative gas passage through which an oxidative gas supplied to the fuel cell flows, a fuel off gas passage through which a fuel off gas discharged from the fuel cell flows, an oxidative off gas passage through which an oxidative off gas discharged from the fuel cell flows, and an odorant removal portion provided in the fuel off gas passage. The odorant removal portion removes the odorant after the fuel gas has been introduced into the fuel cell.

21 Claims, 14 Drawing Sheets

F I G. 15
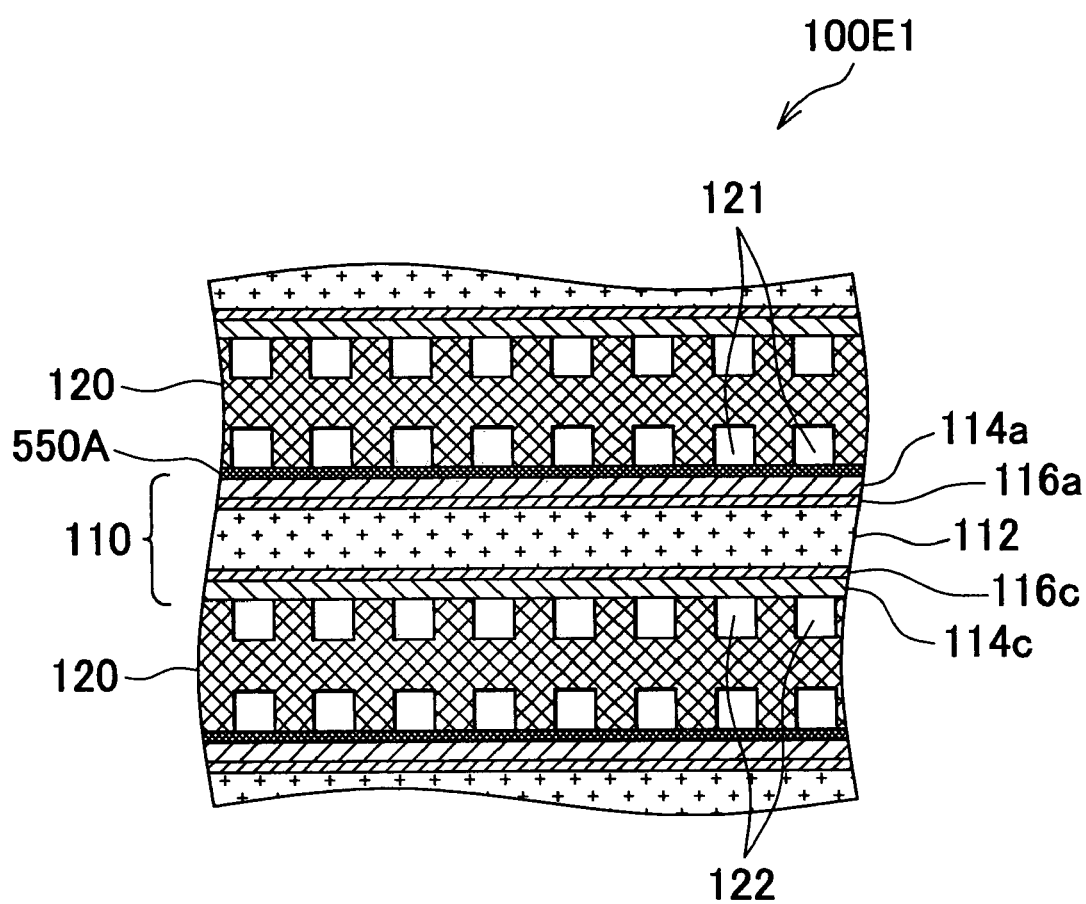

FUEL CELL SYSTEM

INCORPORATION BY REFERENCE

The disclosure of Japanese Patent Application No. 2002-298505 filed on Oct. 11, 2002, including the specification, drawings, and abstract is incorporated herein by reference in its entirety.

BACKGROUND OF THE INVENTION

1. Field of the Invention

The invention relates to a fuel cell system and, more particularly, to an art for removing an odorant from a mixed gas containing hydrogen gas and the odorant.

2. Description of the Related Art

A fuel cell generates electricity by means of hydrogen gas contained in a fuel gas and oxygen gas contained in an oxidative gas. A spent fuel gas (fuel off gas) and a spent oxidative gas (oxidative off gas) are discharged from the fuel cell.

In a fuel cell system, a mixed gas (fuel gas) containing hydrogen gas and an odorant is used to sense leakage of hydrogen gas at an early stage. However, the odorant often deteriorates output characteristics of the fuel cell. Hence, there has been devised a construction wherein an odorant removal portion for removing the odorant from the fuel gas is provided upstream of the fuel cell, more specifically, in a fuel gas passage through which the fuel gas flows. One such fuel cell system is disclosed, for example, in Japanese Patent Application Laid-Open No. 2002-29701.

In such a fuel cell system, however, leakage of hydrogen gas can be sensed only in a fuel gas passage region upstream of a fuel cell.

SUMMARY OF THE INVENTION

The invention has been made to solve the aforementioned problem. It is an object of the invention to provide an art for enlarging a range in which leakage of hydrogen gas can be sensed in a fuel cell.

In order to at least partially solve the problem stated above, a fuel cell system in accordance with a first aspect of the invention comprises a fuel cell, a fuel gas passage which is connected to the fuel cell and through which a fuel gas containing an odorant and hydrogen gas supplied to the fuel cell flows, an oxidative gas passage which is connected to the fuel cell and through which an oxidative gas supplied to the fuel cell flows, a fuel off gas passage which is connected to the fuel cell and through which a fuel off gas discharged from the fuel cell flows, an oxidative off gas passage which is connected to the fuel cell and through which an oxidative off gas discharged from the fuel cell flows, and an odorant removal portion which removes from the fuel gas the odorant after introduction of the fuel gas into the fuel cell.

According to the first aspect, the odorant removal portion can remove the odorant after the fuel gas has been introduced into the fuel cell. Therefore, it is possible to at least sense leakage of hydrogen gas from the fuel gas passage and leakage of hydrogen gas from the fuel cell. That is, it is possible to enlarge an area in which leakage of hydrogen gas can be sensed.

In the first aspect, the odorant may be a specific odorant that is unlikely to deteriorate output characteristics of the fuel cell. For example, the odorant may be butyric acid. In this construction, it is possible to inhibit output characteristics of the fuel cell from deteriorating due to the odorant. Therefore, it is possible to enhance a degree of freedom in disposing the odorant removal portion.

In the aforementioned aspect, the odorant removal portion may be provided in the fuel off gas passage or in a circulation system which causes the fuel off gas discharged from the fuel cell to circulate to the fuel gas passage. In this construction, it is possible to sense leakage of hydrogen gas from the fuel off gas passage at a portion upstream of the odorant removal portion.

In the aforementioned aspect, the odorant removal portion may be provided in a confluent off gas passage into which the fuel off gas passage and the oxidative off gas passage converge. In this construction, it is also possible to sense leakage of hydrogen from the fuel off gas passage. Because the fuel off gas is mixed with the oxidative off gas, the concentration of hydrogen gas contained in the discharged gas can be reduced. Furthermore, in the case where the odorant enters the oxidative off gas passage via the fuel cell, it is also possible to remove the odorant that has entered the oxidative off gas.

Alternatively, in the aforementioned first aspect, the fuel off gas passage may be designed to be connected to the oxidative gas passage, and the odorant removal portion may be provided downstream of a connecting point between the fuel off gas passage and the oxidative gas passage. In this construction, it is also possible to sense leakage of hydrogen gas from the fuel off gas passage. Because the fuel off gas is mixed with the oxidative gas, it is also possible to reduce a concentration of hydrogen gas contained in the discharged gas.

Alternatively, in the aforementioned first aspect, the odorant removal portion may be formed inside the fuel cell and be provided in a passage through which the fuel gas flows. In this construction, it is possible to sense leakage of hydrogen gas from the fuel cell. Further, a space for providing the odorant removal portion need not be prepared outside the fuel cell.

A fuel cell system in accordance with a second aspect of the invention is designed such that a fuel gas containing hydrogen gas and an odorant is introduced into a fuel cell via an opening portion thereof, and an odorant removal portion is provided downstream of the opening portion.

According to the second aspect, the odorant removal portion removes the odorant downstream of the opening portion where the fuel gas is introduced into the fuel cell. Therefore, it is possible to at least sense leakage of hydrogen gas from the fuel gas passage and leakage of hydrogen gas from the fuel cell. That is, it is possible to enlarge an area where leakage of hydrogen gas can be sensed.

Furthermore, in the second aspect, a passage which is connected to the fuel cell and through which a fuel off gas discharged from the fuel cell flows may be provided. Alternatively, an internal fuel gas passage which is formed inside the fuel cell and through which the fuel gas supplied from the opening portion flows may be formed.

It is to be noted herein that the invention can be implemented in various modes including a fuel cell system, a moving object mounted with the fuel cell system, and the like.

BRIEF DESCRIPTION OF THE DRAWINGS

FIG. 15 is an explanatory view schematically showing an electric cell structure inside a fuel cell in accordance with a first modification example of the fifth embodiment.

DETAILED DESCRIPTION OF THE PREFERRED EMBODIMENTS

A. First Embodiment

A-1. Overall Construction of Fuel Cell System

Figure 1:
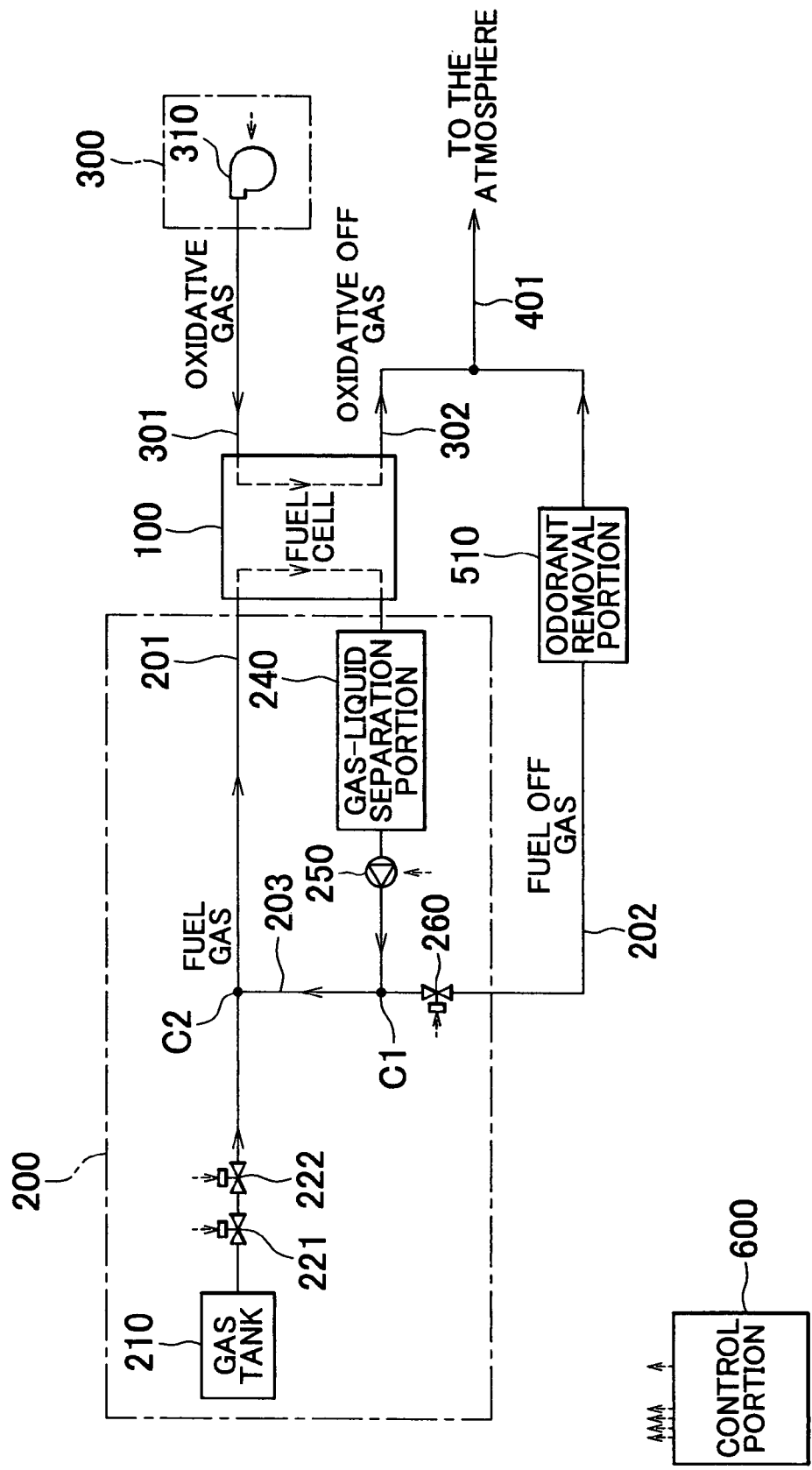
FIG. 1 is an explanatory view of an overall construction of a fuel cell system in accordance with a first embodiment of the invention.

Next, modes of implementing the invention will be described on the basis of embodiments thereof. FIG. 1 is an explanatory view showing an overall construction of a fuel cell system in accordance with the first embodiment. This fuel cell system is installed in a vehicle.

As shown in FIG. 1, a fuel cell system includes a fuel cell 100, a fuel gas supply portion 200 for supplying the fuel cell with a fuel gas containing hydrogen gas, an oxidative gas supply portion 300 for supplying the fuel cell with an oxidative gas (air) containing oxygen gas, and a control portion 600 for controlling operation of the entire fuel cell system. A fuel gas passage 201 through which a fuel gas supplied from the fuel gas supply portion 200 flows and a fuel off gas passage 202 through which a spent fuel off gas flows are connected to the fuel cell 100. Further, an oxidative gas passage 301 through which an oxidative gas supplied from the oxidative gas supply portion 300 flows and an oxidative off gas passage 302 through which a spent oxidative off gas flows are connected to the fuel cell 100. The fuel off gas passage 202 and the oxidative off gas passage 302 converge in their downstream regions into a confluent off gas passage 401. The fuel off gas merges with the oxidative off gas, and is discharged to the outside via the confluent off gas passage 401.

Figure 2:
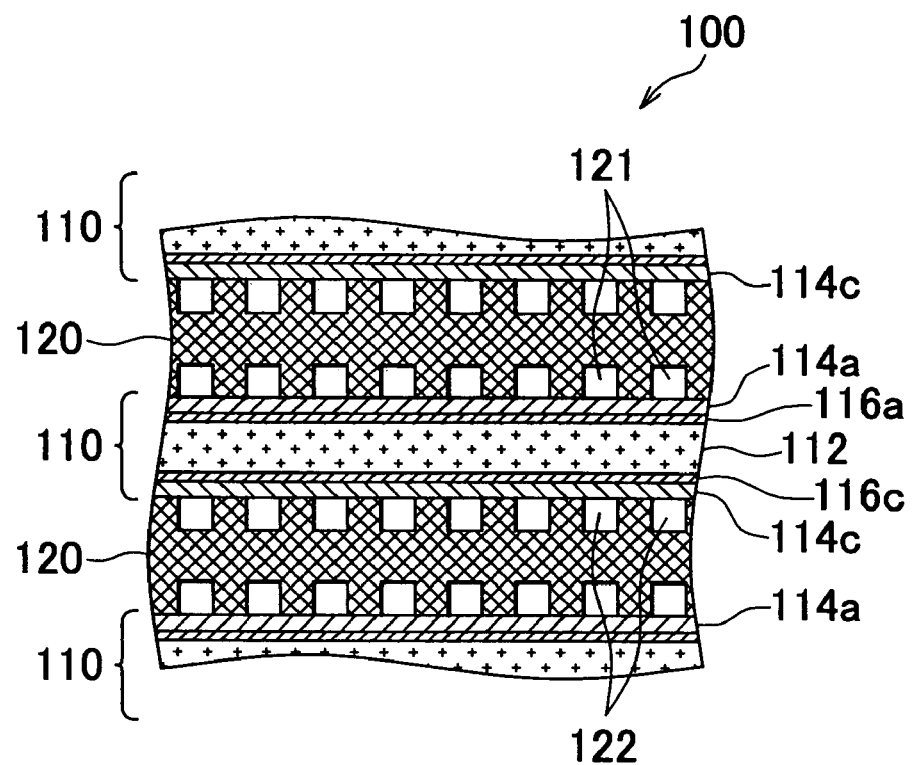
FIG. 2 is an explanatory view schematically showing an electric cell structure inside a fuel cell shown in FIG. 1.

The fuel cell 100 (FIG. 1) is a polymer electrolyte fuel cell which is relatively small in size and exhibits excellent efficiency in generating electricity. FIG. 2 is an explanatory view schematically showing an electric cell structure inside the fuel cell 100 shown in FIG. 1. As shown in FIG. 2, the fuel cell 100 includes a plurality of laminated electric cells (single cells) 110. Each of separators 120 is disposed between two adjacent ones of the single cells.

Each of the single cells 110 includes an electrolyte membrane 112, an anode (hydrogen pole) 114a, and a cathode (oxygen pole) 114c. The electrolyte membrane 112 is sandwiched between the two electrodes 114a and 114c. Each of the separators 120 is so disposed as to be in contact with the anode 114a of one of two adjacent ones of the single cells and with the cathode 114c of the other single cell. A plurality of grooves are formed in both faces of each of the separators 120. A plurality of small passages 121 are formed between the anode 114a and each of the separators 120, whereas a plurality of small passages 122 are formed between the cathode 114c and each of the separators 120.

A fuel gas containing hydrogen gas is supplied to the anode (hydrogen pole)-side passages 121 from the fuel gas supply portion 200, whereas an oxidative gas containing oxygen gas is supplied to the cathode (oxygen pole)-side passage 122 from the oxidative gas supply portion 300. An electrochemical reaction shown below progresses.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

A formula (1) shows a reaction in the anode 114a. A formula (2) shows a reaction in the cathode 114c. A formula (3) progresses on the whole. Water (water vapor) generated in the cathode 114c is referred to as "water product" as well.

The electrolyte membrane 112 is a positive ion exchange resin membrane exhibiting good electrical conductivity in a wet state. As the positive ion exchange resin membrane, a membrane formed of a solid polymer material such as fluororesin or the like can be used. For instance, Nafion® (manufactured by Du Pont Co., Ltd.) can be used. The anode 114a and the cathode 114c are formed of materials exhibiting sufficient gas diffusibility and sufficient electrical conductivity. These materials include carbon cloth, carbon paper, carbon felt and the like, which are manufactured by weaving carbon fiber. Catalytic layers 116a and 116c, which cause reactions in the electrodes 114a and 114c at a relatively low temperature (from about 50° C. to about 100° C.) respectively, are formed in an interface between the electrode 114a and the electrolyte membrane 112 and in an interface between the electrode 114c and the electrolyte membrane 112, respectively. As an example of catalysts, Pt or an alloy containing Pt can be used. The separators 120 are formed of a material exhibiting sufficient gas impermeability, sufficient electrical conductivity, and sufficient corrosion resistance. This material is press-formed carbon, a metal or the like.

As described above, the fuel cell 100 generates electricity by means of hydrogen gas contained in the fuel gas supplied from the fuel gas supply portion 200 and oxygen gas contained in the oxidative gas (air) supplied from the oxidative gas supply portion 300.

The fuel gas supply portion 200 (FIG. 1) includes a gas tank 210, a pressure reducing valve 221, and a flow control valve 222. The gas tank 210 stores a mixed gas (fuel gas) containing hydrogen gas and an odorant at a relatively high pressure. The pressure reducing valve 221 reduces the fuel gas supplied from the gas tank 210 to a predetermined pressure. The flow control valve 222 adjusts a flow rate of the fuel gas and supplies it to the fuel cell 100.

The fuel gas supply portion 200 further includes a gas-liquid separation portion 240, a circulating pump 250, and a shut-off valve 260. The gas-separation portion 240, the circulating pump 250, and the shut-off valve 260 are arranged in this order along the fuel off gas passage 202. The fuel off gas passage 202 and the fuel gas passage 201 are connected by a circulation passage 203. More specifically, the circulation passage 203 is connected to the fuel off gas passage 202 at a first connecting point C1 between the circulating pump 250 and the shut-off valve 260, and is connected to the fuel gas passage 201 at a second connecting point C2 downstream of the flow control valve 222.

The circulating pump 250 has a function of returning a fuel off gas containing a relatively low concentration of hydrogen gas into the fuel gas passage 201 as a fuel gas. Because of this construction, the fuel gas circulates through an annular passage. By thus causing the fuel gas to circulate, it becomes possible to increase a flow rate (mol/sec) of hydrogen gas supplied into the fuel cell 100 per unit time. As a result, reaction efficiency in the fuel cell 100 can be enhanced. However, as the electrochemical reaction in the fuel cell 100 progresses, the amount (mol) of hydrogen gas contained in the fuel gas in the annular passage decreases. Nitrogen gas, water vapor (water product) and the like contained in the oxidative gas in the cathode-side passage 122 enter the fuel gas in the anode-side passage 121 via the electrolyte membrane 112 inside the fuel cell 100. Therefore, the concentration (volume percentage) of hydrogen gas contained in the fuel gas gradually decreases. In this embodiment, therefore, the flow control valve 222 and the shut-off valve 260 are so set as to be opened intermittently. Thus, the fuel gas containing a high concentration of hydrogen gas is supplied to the fuel cell 100, whereas the fuel off gas containing a low concentration of hydrogen gas is discharged from the fuel cell 100. The gas-liquid separation portion 240 has a function of removing excessive water vapor from the fuel off gas.

The fuel off gas passage 202 is provided with an odorant removal portion 510. The odorant removal portion 510 has a function of removing an odorant from the fuel off gas. The fuel off gas which has been discharged from the odorant removal portion 510 and which contains almost no odorant is discharged to the atmosphere via the fuel off gas passage 202 and the confluent off gas passage 401. The odorant removal portion 510 will be described later in more detail.

The oxidative gas supply portion 300 is provided with an air blower 310. The oxidative gas supply portion 300 supplies the oxidative gas (air) containing oxygen gas to the fuel cell 100 via the oxidative gas passage 301. The spent oxidative off gas is discharged to the atmosphere via the oxidative off gas passage 302 and the confluent off gas passage 401.

A-2. Construction of Odorant Treatment Portion

Figure 3:
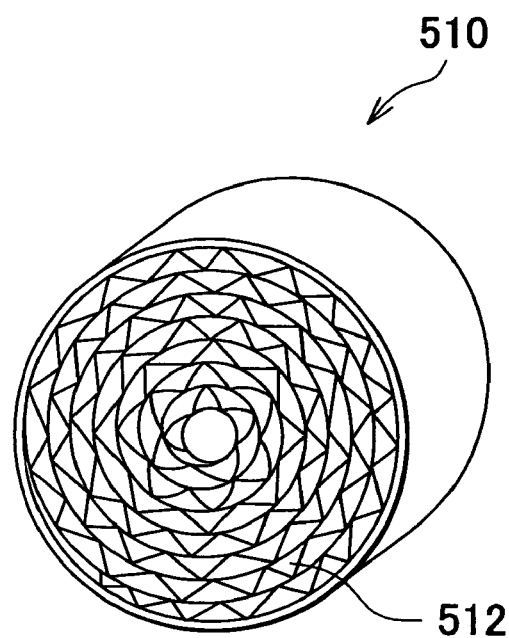
FIG. 3 is an explanatory view schematically showing an internal structure of an odorant removal portion shown in FIG. 1.

FIG. 3 is an explanatory view showing an internal structure of the odorant removal portion 510 shown in FIG. 1. The odorant removal portion 510 includes a carrier 512 having a plurality of corrugated small passages. An adsorbent is carried on the carrier 512.

Figure 4:
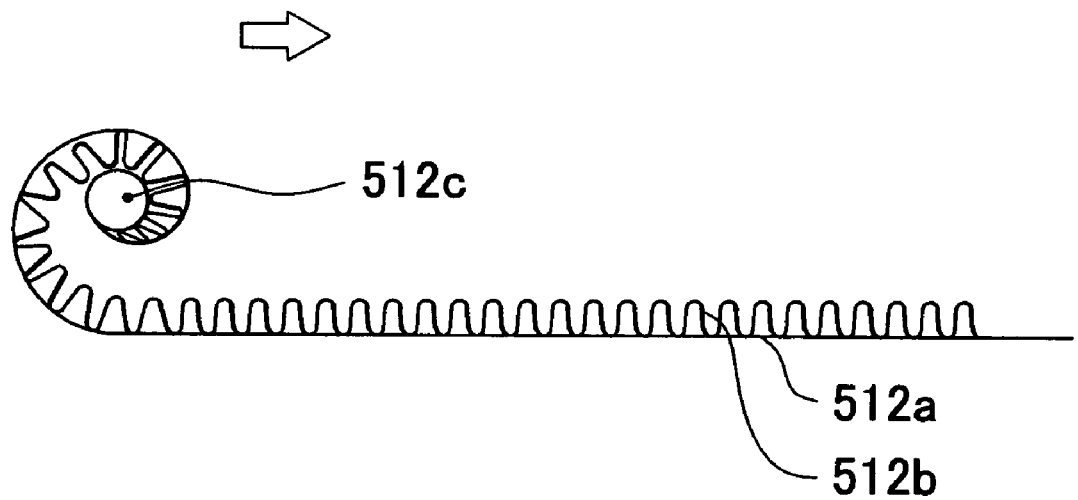
FIG. 4 is an explanatory view showing a method of manufacturing the odorant removal portion shown in FIG. 3.

FIG. 4 is an explanatory view showing a method of manufacturing the odorant removal portion 510 shown in FIG. 3. As shown in FIG. 4, the carrier 512 is formed of a sheet composed of a flat plate 512a and a corrugated plate 512b. The sheet is joined at one end thereof to an axial member 512c. Then, the sheet is spirally wound around the axial member, which serves as a core. That is, the carrier 512 (FIG. 3) has a roll structure in which the flat plate 512a and the corrugated plate 512b are alternately wound around the axial member 512c. The distance between adjacent portions of the flat plate 512a is held substantially constant by the corrugated plate 512b. Formed between the flat plate 512a and the corrugated plate 512b are a plurality of corrugated small passages, which extend along an axial direction of the axial member 512c. After the carrier 512 has been prepared, an adsorbent is carried on the carrier 512. For instance, the carrier 512 is soaked in a solution containing the adsorbent and then is baked, whereby the adsorbent is fixed onto the carrier 512.

A metal material such as stainless steel or the like can be used as the flat plate 512a and the corrugated plate 512b. A porous material such as activated carbon, zeolite or the like can be used as the adsorbent. Although the carrier 512 has a roll structure in the first embodiment, the carrier 512 may have a honeycomb structure instead.

As described above, the odorant removal portion 510 contains the adsorbent. Therefore, the adsorbent adsorbs the odorant in the fuel off gas, whereby it becomes possible to remove the odorant from the fuel off gas. The odorant is physically adsorbed into micropores of the adsorbent.

In the related art, t-butyl mercaptan (TBM) containing sulfur is used as the odorant. If an odorant containing sulfur, for example, TBM or the like is used in the system shown in FIG. 1, output characteristics of the fuel cell is likely to deteriorate. This is because the catalyst inside the fuel cell is likely to be poisoned due to the odorant.

In the first embodiment, therefore, a specific odorant that makes output characteristics of the fuel cell unlikely to deteriorate is used as the odorant. More specifically, butyric acid is used in the first embodiment. Butyric acid is unlikely to poison the catalyst inside the fuel cell, and therefore is unlikely to deteriorate output characteristics of the fuel cell. Thus, by using butyric acid as the odorant, it becomes possible to provide the odorant removal portion 510 downstream of the fuel cell 100, more specifically, in the fuel off gas passage 202. Butyric acid that is used as the odorant has properties which make output characteristics of the fuel cell unlikely to deteriorate. Therefore, the odorant removal portion 510 can be provided downstream of the fuel cell. Thus, it is possible to sense not only leakage of hydrogen gas from the fuel gas passage 201 upstream of the fuel cell 100 but also leakage of hydrogen gas from a connecting portion between the fuel cell 100 and the fuel gas passage 201 or from the interior of the fuel cell.

As described hitherto, the fuel cell system of the first embodiment includes the fuel cell 100, the fuel gas passage 201, the oxidative gas passage 301, the fuel off gas passage 202, the oxidative off gas passage 302, and the odorant removal portion 510 provided in the fuel off gas passage 202. In order to remove the odorant after introduction of the fuel gas into the fuel cell 100, the odorant removal portion 510 can sense leakage of hydrogen gas from the fuel gas passage 201, leakage of hydrogen gas from the fuel cell 100, and leakage of hydrogen gas from the fuel off gas passage at a portion upstream of the odorant removal portion 510. That is, adoption of the construction of the first embodiment makes it possible to enlarge a range where leakage of hydrogen gas can be sensed.

In the first embodiment, the circulating pump 250 is provided in the fuel off gas passage 202. Instead, however, the circulating pump 250 may be provided in the circulation passage 203.

In the first embodiment, the fuel off gas passage 202 and the oxidative off gas passage 302 are connected in their downstream regions to the confluent off gas passage 401. However, the confluent off gas passage 401 can be omitted. However, the construction of the first embodiment wherein the fuel off gas and the oxidative off gas are mixed with each other is advantageous in that the concentration (volume percentage) of hydrogen gas contained in the mixed gas discharged to the atmosphere can be reduced.

B. Second Embodiment

Figure 5:
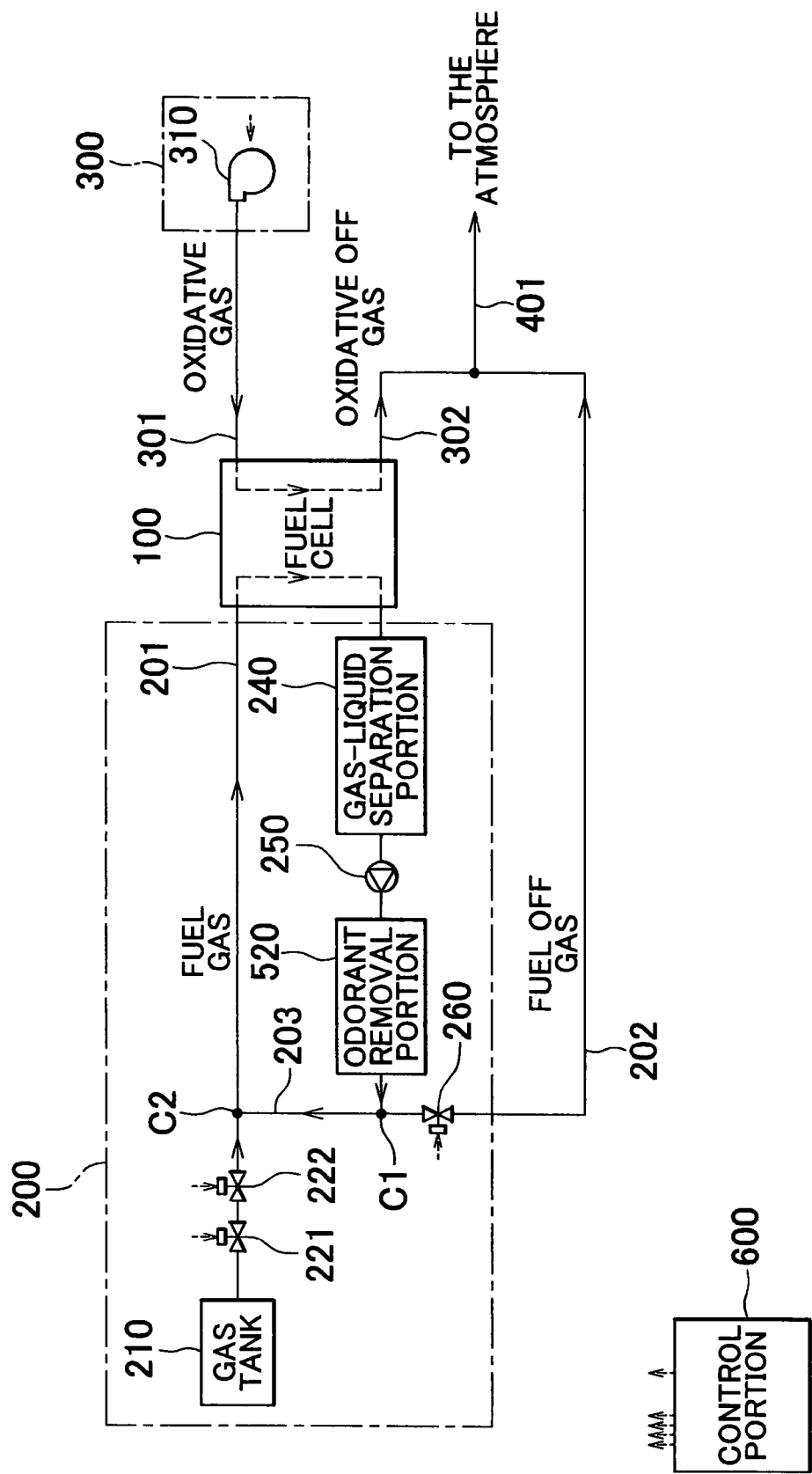
FIG. 5 is an explanatory view showing an overall construction of a fuel cell system in accordance with a second embodiment of the invention.

FIG. 5 is an explanatory view showing an overall construction of a fuel cell system in accordance with the second embodiment. Although FIG. 5 is substantially identical with FIG. 1, disposal of the odorant removal portion 520 has been modified. To be more specific, although the odorant removal portion 510 is provided in the fuel off gas passage 202 downstream of the shut-off valve 260 in FIG. 1, the odorant removal portion 520 is provided in the fuel off gas passage 202 between the circulating pump 250 and the first connecting point C1 in FIG. 5.

Even in the case where the construction shown in FIG. 5 is adopted, it is possible to sense leakage of hydrogen gas from the fuel gas passage 201, leakage of hydrogen gas from the fuel cell 100, and leakage of hydrogen gas from the fuel off gas passage at a portion upstream of the odorant removal portion 520.

In the case where the fuel off gas discharged from the fuel cell 100 is caused to circulate from the fuel off gas passage 202 to the fuel gas passage 201 via the circulation passage 203, the concentration (volume percentage) of the odorant contained in the fuel gas gradually increases in the annular passage. As shown in FIG. 5, however, according to the construction wherein the odorant removal portion 520 is disposed in the annular passage, the odorant removal portion 520 can remove the odorant in the annular passage. Therefore, the concentration of the odorant contained in the fuel gas can be inhibited from increasing in the annular passage.

Figure 6:
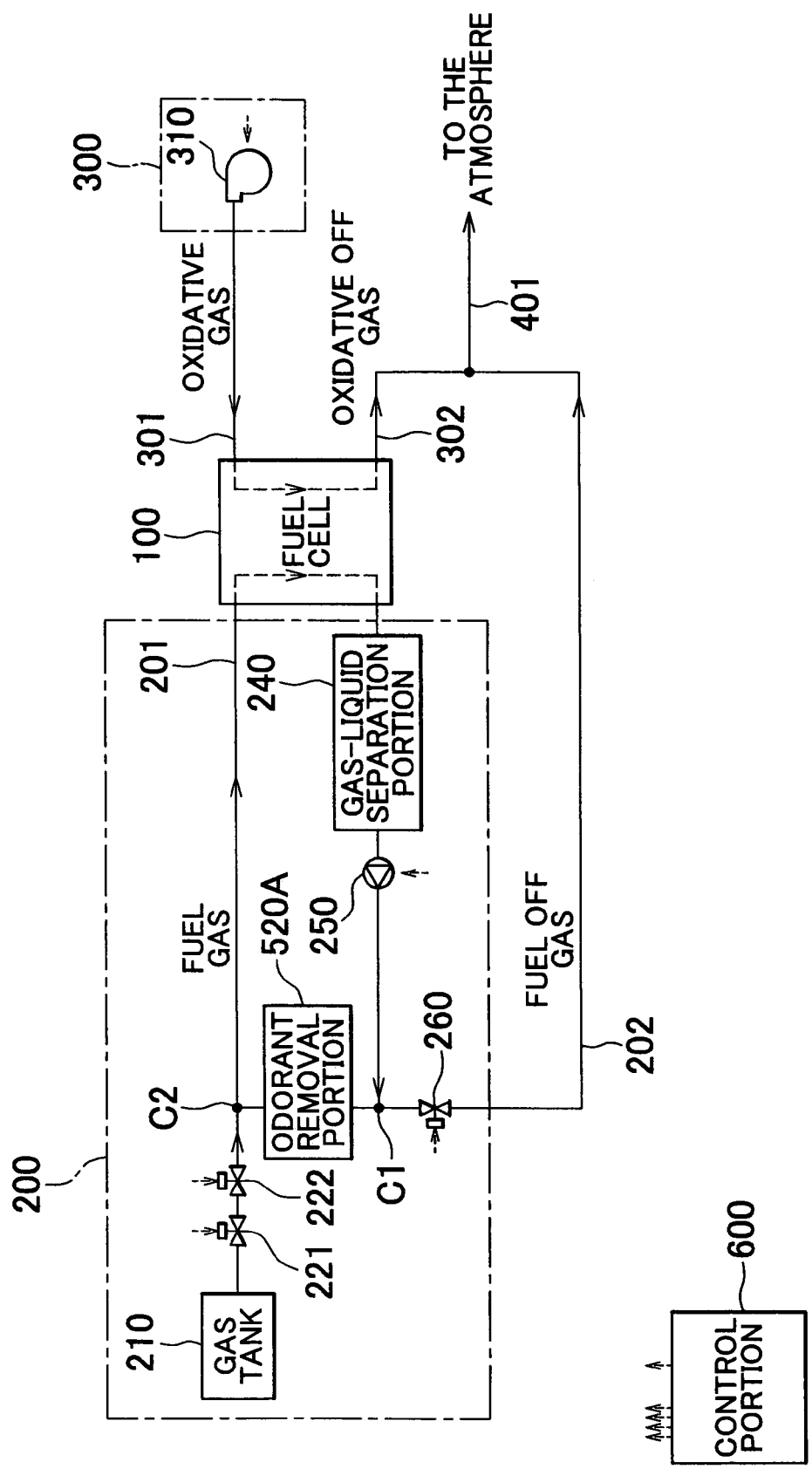
FIG. 6 is an explanatory view showing an overall construction of a fuel cell system in accordance with a modification example of the second embodiment.

In FIG. 5, the odorant removal portion 520 is provided between the circulating pump 250 and the first connecting point C1. Instead, however, the odorant removal portion 520 may be provided between the gas-liquid separation portion 240 and the circulating pump 250. In FIG. 5, the odorant removal portion 520 is provided in the fuel off gas passage 202. Instead, however, an odorant removal portion 520A may be provided in the circulation passage 203 as shown in FIG. 6.

In general, in the case where a fuel cell system includes a circulation passage for connecting a fuel off gas passage to a fuel gas passage and is equipped with a circulation system for causing a fuel gas to circulate, it is appropriate that an odorant removal portion be provided in the circulation system. In FIG. 5, the circulation system includes a passage extending from the fuel cell to the first connecting point C1 (i.e., an upstream portion of the fuel off gas passage) and a passage extending from the first connecting point to a second connecting point C2 (i.e., the circulation passage).

C. Third Embodiment

Figure 7:
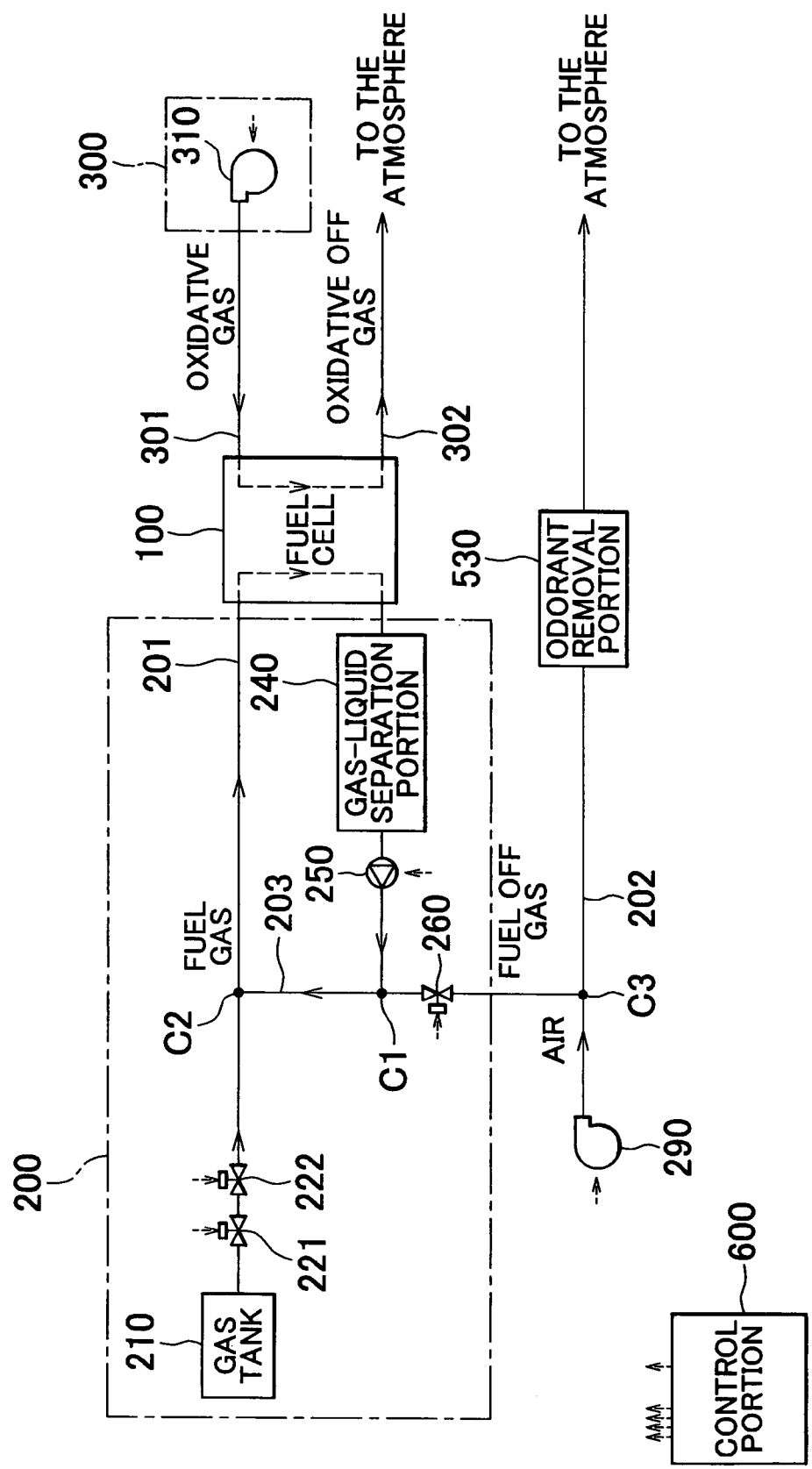
FIG. 7 is an explanatory view showing an overall construction of a fuel cell system in accordance with a third embodiment of the invention.

FIG. 7 is an explanatory view showing an overall construction of a fuel cell system in accordance with the third embodiment. Although FIG. 7 is substantially identical with FIG. 1, the confluent off gas passage 401 is omitted, and an air blower 290 is added. The air blower 290 is connected to the fuel off gas passage 202 at a third connecting point C3 downstream of the shut-off valve 260, and introduces air into the fuel off gas passage 202. The air that has been introduced into the fuel off gas passage 202 is supplied to an odorant removal portion 530.

Even in the case where the construction shown in FIG. 7 is adopted, the concentration (volume percentage) of hydrogen gas contained in the fuel off gas discharged to the atmosphere can be reduced by means of air supplied from the air blower 290.

C-1. First Modification Example of Third Embodiment

Figure 8:
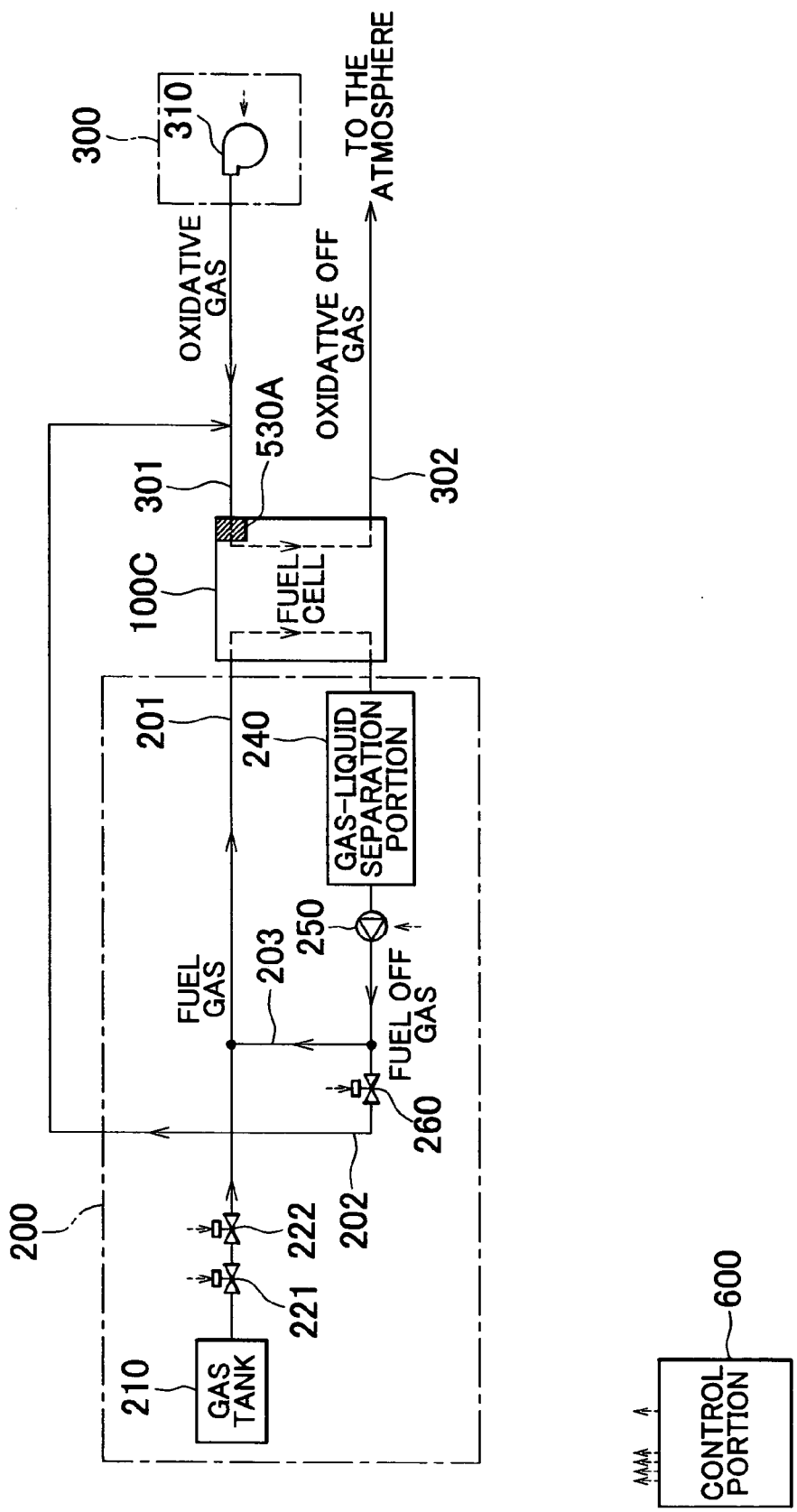
FIG. 8 is an explanatory view showing an overall construction of a fuel cell system in accordance with a first modification example of the third embodiment.

FIG. 8 is an explanatory view showing an overall construction of a fuel cell system in accordance with a first modification example of the third embodiment. Although FIG. 8 is substantially identical with FIG. 7, disposal of the odorant removal portion 530A has been modified. More specifically, although the odorant removal portion 530 is provided in the fuel off gas passage 202 in FIG. 7, an odorant removal portion 530A is provided inside a fuel cell 100C in FIG. 8. In FIG. 8, the fuel off gas passage 202 is connected to the oxidative gas passage 301, and the air blower 290 is omitted.

Figure 9:
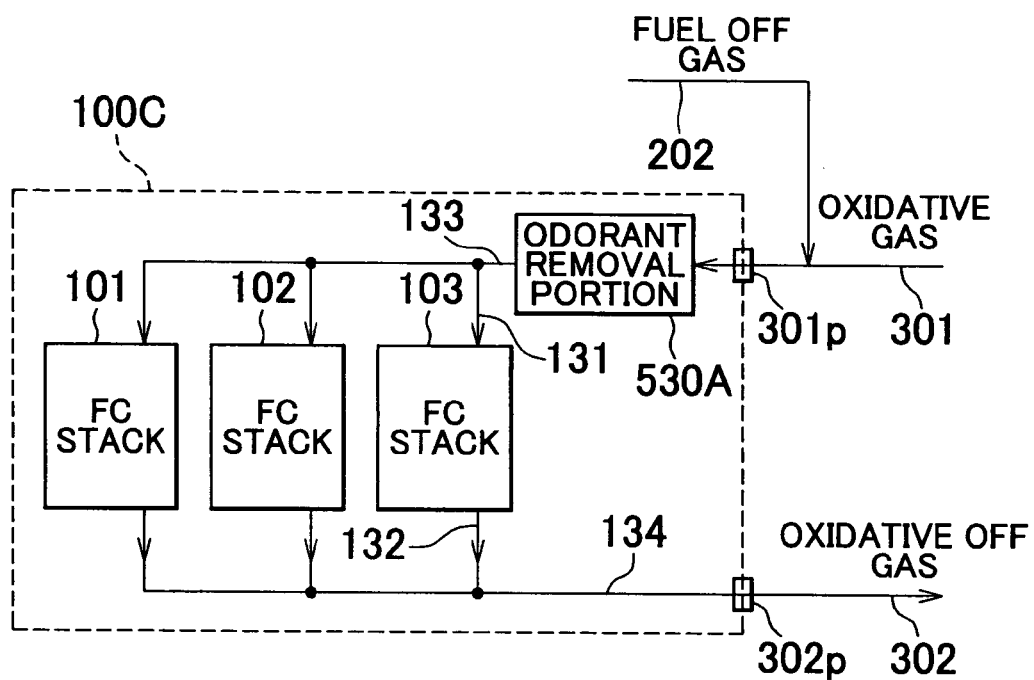
FIG. 9 is an explanatory view schematically showing an internal construction of a fuel cell shown in FIG. 8.

FIG. 9 is an explanatory view schematically showing an internal construction of the fuel cell shown in FIG. 8. As shown in FIG. 9, the fuel cell 100C includes three stacks 101 to 103, a plurality of first branch pipes 131 for distributing an oxidative gas to the stacks respectively, and a plurality of second branch pipes 132 for gathering oxidative off gases flowing from the stacks respectively. As described with reference to FIG. 2, each of the stacks 101 to 103 includes a plurality of laminated single cells. A basal passage 133 upstream of the stacks is connected to the stacks 101 to 103 via the first branch pipes 131 respectively. The basal passage 133 is connected to the oxidative gas passage 301 via an oxidative gas supply port 301p. A basal passage 134 downstream of the fuel cell is connected to the stacks 101 to 103 via the second branch pipes 132 respectively. The basal passage 134 is connected to the oxidative off gas passage 302 via an oxidative off gas discharge port 302p. The odorant removal portion 530A is provided in the basal passage 133 that is located upstream of the stacks.

As shown in FIGS. 8 and 9, if the construction wherein the fuel off gas passage 202 is connected to the oxidative gas passage 301 and wherein the passage leading to the respective stacks inside the fuel cell extends across the odorant removal portion 530A is adopted, it is possible to sense leakage of hydrogen gas from the fuel gas passage 201, leakage of hydrogen gas from the fuel cell 100C, and leakage of hydrogen gas from the fuel off gas passage 202. Further, the air blower 290 shown in FIG. 7 can be omitted, and the concentration (volume percentage) of hydrogen gas contained in the mixed off gas discharged to the atmosphere can be reduced by means of the oxidative gas (air) supplied from the air blower 310 included in the oxidative gas supply portion 300. In addition, since a space for providing the odorant removal portion need not be prepared outside the fuel cell, an existent fuel cell system can be relatively easily substituted for.

In FIG. 9, the odorant removal portion 530A is provided in the basal passage 133 upstream of the stacks. Instead, however, it is also appropriate that the odorant removal portion 530A be provided in each of the first branch pipes 131. In FIG. 9, the odorant removal portion 530A is provided in the basal passage 133 upstream of the stacks. Instead, however, it is also appropriate that the odorant removal portion 530A be provided in the basal passage 134 downstream of the stacks. In general, if a fuel off gas passage is connected to an oxidative gas passage, it is appropriate that an odorant removal portion be provided downstream of a connecting point between the fuel off gas passage and the oxidative gas passage.

C-2. Second Modification Example of Third Embodiment

In FIG. 7, the air blower 290 supplies air (oxygen gas) to the odorant removal portion 530. In FIG. 8, the air blower 310 supplies air (oxygen gas) to the odorant removal portion 530A. In these cases, it is preferable that the odorant removal portion be equipped with a porous adsorbent and a catalyst for promoting oxidation of an odorant. As the catalyst, a noble metal catalyst such as Pt, Pd, Ru or the like can be used. The odorant removal portion as mentioned above can be prepared, for example, by soaking the carrier 512 shown in FIG. 3 in a solution containing an adsorbent and a catalyst and then baking the carrier 512.

If the odorant removal portion includes only a porous adsorbent, there is a limit to the amount of an odorant that can be adsorbed by the odorant removal portion. The speed at which the odorant removal portion adsorbs the odorant decreases as the amount of the adsorbed odorant increases. As described above, however, if the odorant removal portion includes a porous adsorbent and a noble metal catalyst, the odorant removal portion can oxidize (burn) the physically adsorbed odorant by means of oxygen gas contained in supplied air. Accordingly, it is possible to recover adsorption capacity, which deteriorates as the amount of the adsorbed odorant increases. As a result, replacement of an odorant treatment portion can be omitted.

C-3. Third Modification Example of Third Embodiment

In the case where the odorant removal portions 530 and 530A are supplied with air (oxygen gas) as shown in FIGS. 7 and 8, they may include a catalyst for promoting oxidation of an odorant instead of a porous adsorbent. As the catalyst, a noble metal catalyst such as Pt, Pd, Ru or the like can be used. This odorant removal portion can be prepared, for example, by soaking the carrier 512 shown in FIG. 3 in a solution containing the catalyst and then baking the carrier 512.

This odorant removal portion can oxidize (burn) the odorant contained in the fuel off gas by means of oxygen gas contained in supplied air. That is, even in the case where this odorant removal portion is adopted, the odorant can be removed from the fuel off gas, and replacement of the odorant treatment portion can be omitted.

As described with reference to FIG. 2, the catalyst 116c containing a noble metal such as Pt or the like is formed in the interface between the cathode 114c and the electrolyte membrane 112 of the fuel cell. Hence, if the construction shown in FIG. 8 is adopted, the odorant can be oxidized in the cathode-side passage 122 as well.

D. Fourth Embodiment

Figure 10:
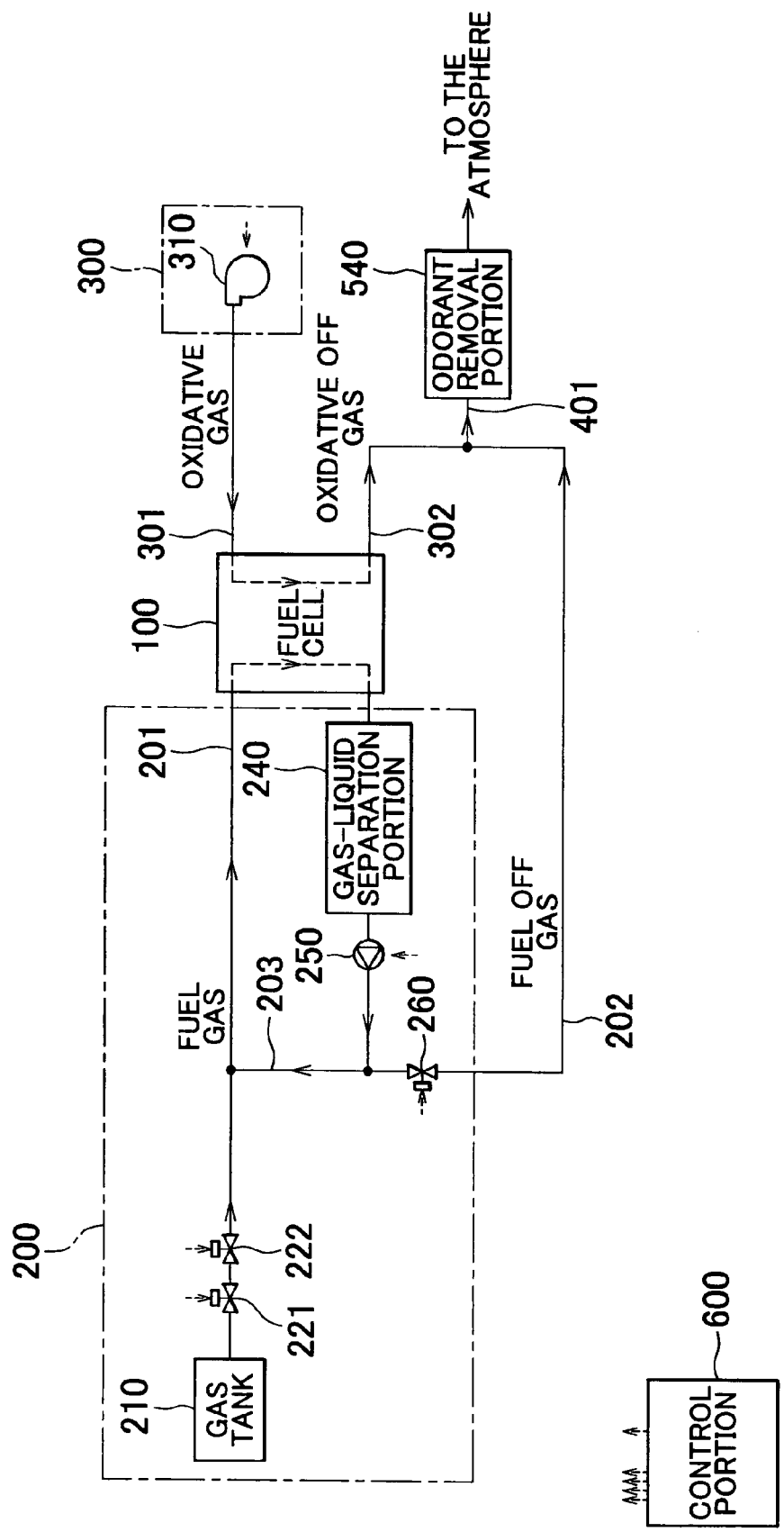
FIG. 10 is an explanatory view showing an overall construction of a fuel cell system in accordance with a fourth embodiment of the invention.

FIG. 10 is an explanatory view showing an overall construction of a fuel cell system in accordance with the fourth embodiment. Although FIG. 10 is substantially identical with FIG. 1, disposal of the odorant removal portion 540 has been modified. More specifically, although the odorant removal portion 510 is provided in the fuel off gas passage 202 in FIG. 1, the odorant removal portion 540 is provided in the confluent off gas passage 401 in FIG. 10.

If the construction shown in FIG. 10 in which the odorant removal portion 540 is provided in the confluent off gas passage 401 is adopted, it is possible to sense leakage of hydrogen gas from the fuel gas passage 201, leakage of hydrogen gas from the fuel cell 100, and leakage of hydrogen gas from the fuel off gas passage 202. Further, since the fuel off gas is mixed with the oxidative off gas, it is also possible to reduce a concentration (volume percentage) of hydrogen gas contained in the mixed off gas discharged to the atmosphere.

The odorant contained in the fuel gas may enter the cathode-side passage 122 from the anode-side passage 121 via the electrolyte membrane 112 (FIG. 2) inside the fuel cell 100. In the case where the construction shown in FIG. 1 is adopted, the odorant that has entered the oxidative off gas is directly discharged to the atmosphere. However, in the case where the construction shown in FIG. 10 is adopted, the odorant removal portion 540 can remove both the odorant contained in the fuel off gas and the odorant that has entered the oxidative off gas.

The oxidative off gas contains oxygen gas that has not been used in the electrochemical reaction in the fuel cell 100. Accordingly, as described in the second and third modification examples of the third embodiment, the odorant removal portion may also include a noble metal catalyst. Thus, the odorant removal portion can oxidize the odorant.

In FIG. 10, the odorant removal portion 540 is provided only in the confluent off gas passage 401. However, an additional odorant removal portion may be provided in the fuel off gas passage 202.

D-1. Modification Example of Fourth Embodiment

Figure 11:
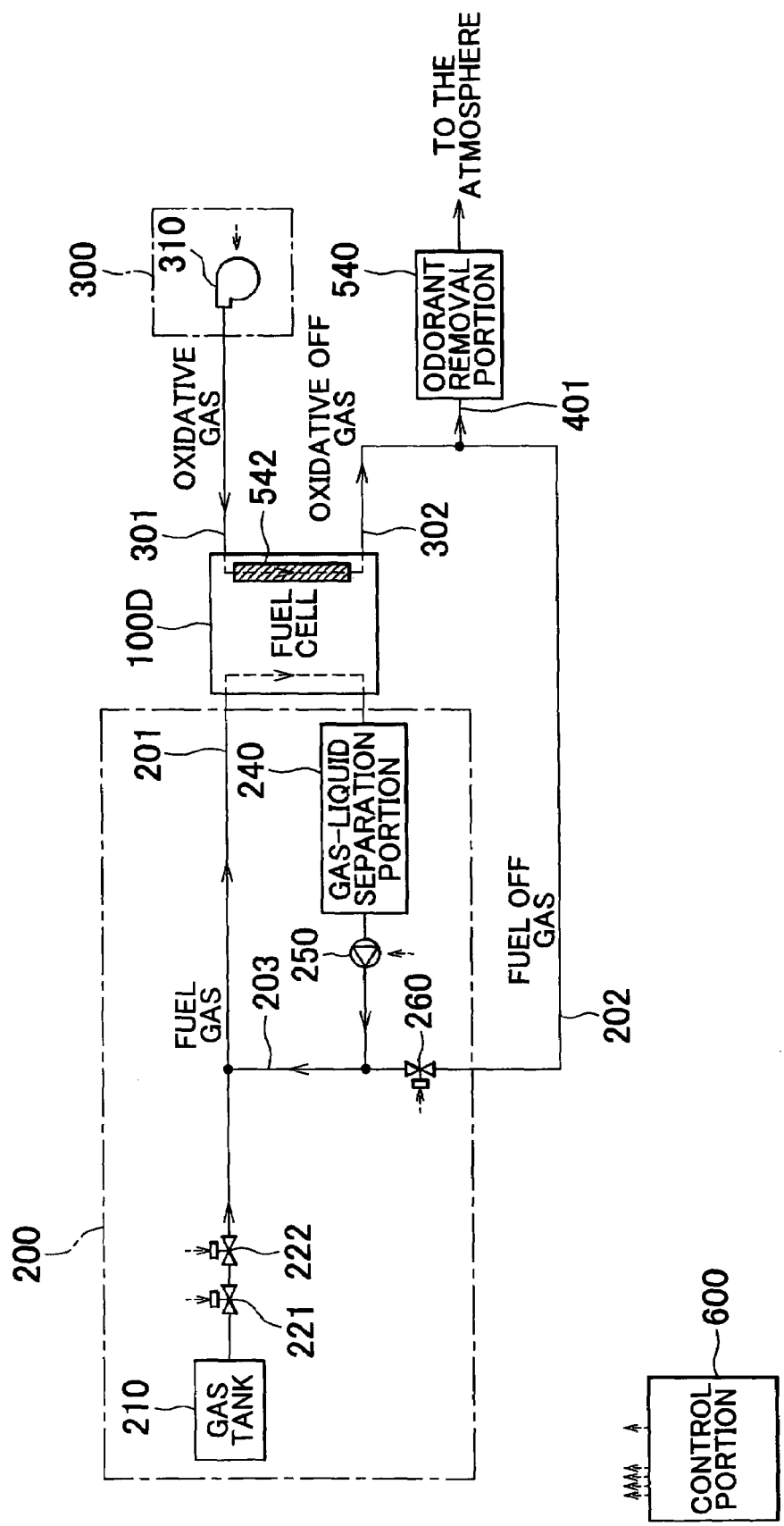
FIG. 11 is an explanatory view showing an overall construction of a fuel cell system in accordance with a modification example of the fourth embodiment.

FIG. 11 is an explanatory view showing an overall construction of a fuel cell system in accordance with a modification example of the fourth embodiment. Although FIG. 11 is substantially identical with FIG. 10, an odorant removal portion 542 has been added to the interior of a fuel cell 100D.

Figure 12:
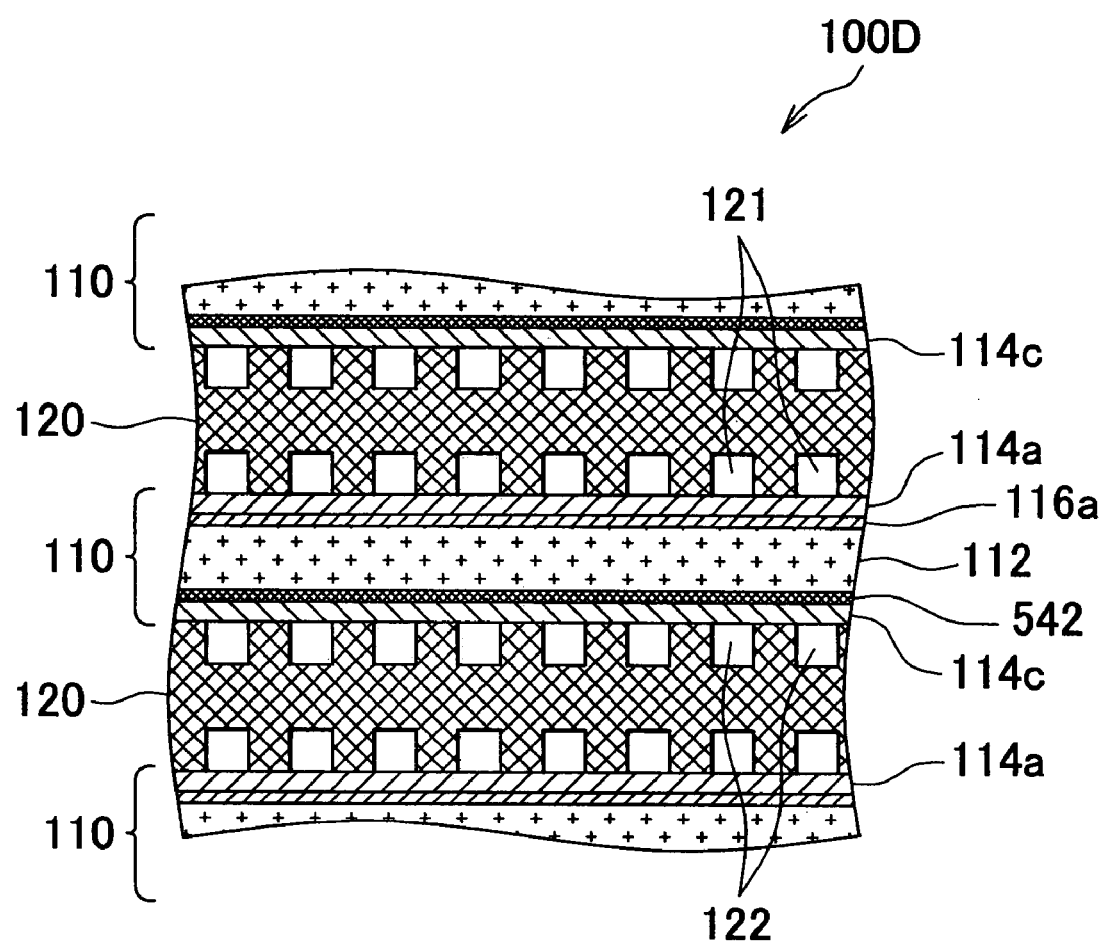
FIG. 12 is an explanatory view schematically showing an electric cell structure inside a fuel cell shown in FIG. 11.

FIG. 12 is an explanatory view schematically showing an electric cell structure inside the fuel cell 100D shown in FIG. 11. FIG. 12 is substantially identical with FIG. 2. Instead of the catalytic layer 116c, however, the odorant removal portion 542 containing a porous adsorbent and a noble metal catalyst is formed in the interface between the electrolyte membrane 112 and the cathode 114c.

If the construction shown in FIG. 12 is adopted, the odorant removal portion 542 can physically adsorb an odorant that is about to enter the cathode-side passage 122 via the electrolyte membrane 112, and can oxidize (burn) the physically adsorbed odorant by means of oxygen gas contained in the supplied oxidative gas (air).

E. Fifth Embodiment

In the first to fourth embodiments, butyric acid is used as the odorant. In the fifth embodiment, however, t-butyl mercaptan (TBM) is used as the odorant. As described above, an odorant containing sulfur, for example, TBM or the like poisons the catalyst inside the fuel cell, so that output characteristics of the fuel cell deteriorate.

In the fuel cell system of the fifth embodiment, even in the case where an odorant that is likely to deteriorate output characteristics of the fuel cell is used, a contrivance has been made such that a fuel gas containing the odorant can be introduced into the fuel cell. Thus, instead of TBM, tetrahydrothiophene (THT), dimethyl sulfide (DMS), methyl mercaptan, ethyl mercaptan or the like can be used as an odorant that is likely to deteriorate output characteristics of the fuel cell.

Figure 13:
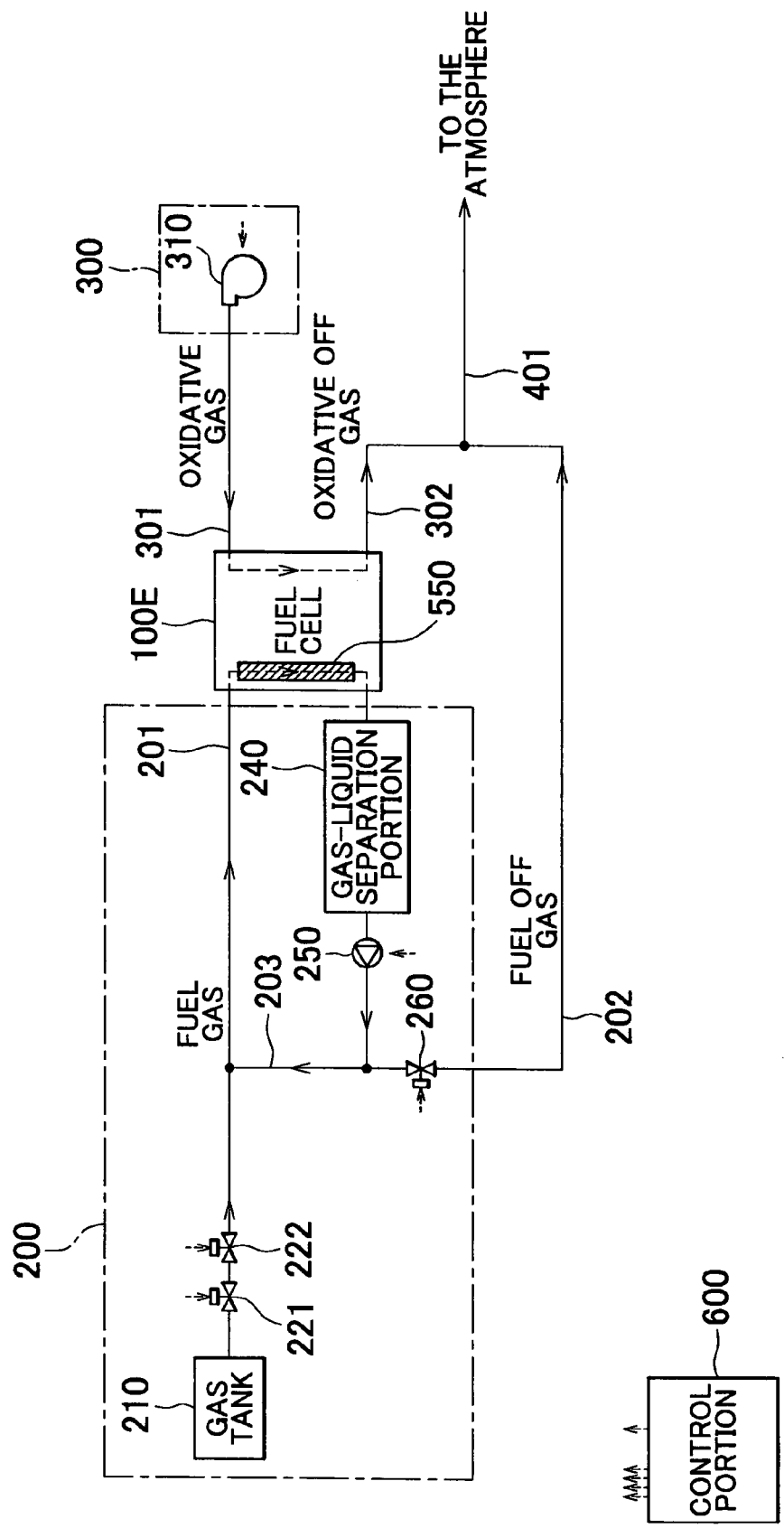
FIG. 13 is an explanatory view showing an overall construction of a fuel cell system in accordance with a fifth embodiment of the invention.

FIG. 13 is an explanatory view showing an overall construction of a fuel cell system in accordance with the fifth embodiment. In FIG. 13, an odorant removal portion 550 is provided inside the fuel cell 100E.

Figure 14:
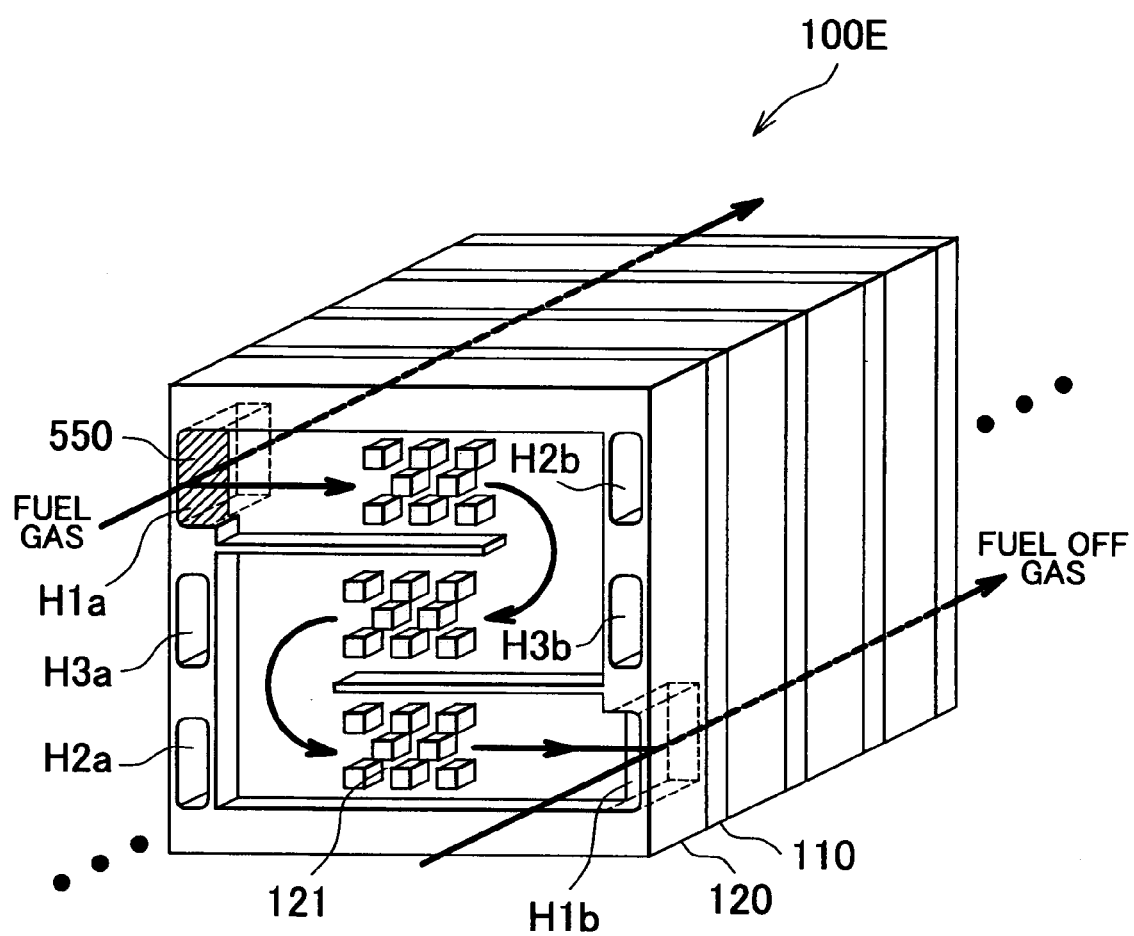
FIG. 14 is an explanatory view schematically showing a stack structure inside a fuel cell 100E shown in FIG. 13.

FIG. 14 is an explanatory view schematically showing a stack structure inside the fuel cell 100E shown in FIG. 13. As shown in FIG. 14, a stack 100E includes a plurality of laminated single cells 110. The stack 100E is provided with three pairs of distribution passages, which penetrate the stack. The first pair of the distribution passages H1a and H1b communicates with the anode-side passage 121 formed in one face of each of the separators 120. The fuel gas that has been introduced from an opening portion of the fuel cell is distributed to the respective single cells via the distribution passages H1a and H1b. The second pair of the distribution passages H2a and H2b communicates with the cathode-side passage formed in the other face of each of the separators 120, and distributes the oxidative gas to the respective single cells. The third pair of the distribution passages H3a and H3b communicates with a cooling passage formed in each of specific ones of the separators, and distributes coolant thereto. Each of these specific separators exists among a certain number of the separators.

In FIG. 14, the odorant removal portion 550 is provided on a wall of the first distribution passage H1a. The odorant is removed from the fuel gas in the first distribution passage H1a. Hence, the odorant does not enter the single cells 110 (more specifically, the catalytic layer 116a between the electrolyte membrane 112 and the anode 114a shown in FIG. 2). As a result, the catalyst inside the fuel cell can be inhibited from being poisoned. The first distribution passage H1a may have a honeycomb structure. Thus, the area for forming the odorant removal portion can be increased. Therefore, the odorant can be removed more reliably.

E-1. First Modification Example of Fifth Embodiment

FIG. 15 is an explanatory view schematically showing an electric cell structure inside a fuel cell 100E1 in accordance with a first modification example of the fifth embodiment. Although FIG. 15 is substantially identical with FIG. 2, an odorant removal portion 550A is additionally disposed on the anode 114a. The odorant removal portion 550A can be obtained, for example, by applying a porous adsorbent on the anode 114a and baking the adsorbent.

In FIG. 15, the odorant removal portion 550A is provided on the anode 114a, namely, on one face of each of the single cells 110 where the anode-side passages 121 are formed. The odorant is removed from the fuel gas in the anode-side passages 121. Hence, the odorant does not enter the single cells 110 (more specifically, the catalytic layer 116a between the electrolyte membrane 112 and the anode 114a). As a result, the catalyst inside the fuel cell can be inhibited from being poisoned.

As shown in FIGS. 14 and 15, if the construction wherein the odorant removal portions 500 and 550A are disposed in the anode-side passages 121 inside the fuel cell or in the passages H1a and H1b leading to the anode-side passages 121 is adopted, it is possible to sense leakage of hydrogen gas from the interiors of the fuel cells 100E and 100E1. It is also possible to use an odorant that is unlikely to deteriorate output characteristics of the fuel cell.

E-2. Second Modification Example of Fifth Embodiment

In FIGS. 13 to 15, TBM is used as the odorant. Instead, however, butyric acid can also be used. In this case, the odorant removal portion may be provided somewhere else inside the fuel cell. For instance, the odorant removal portion 550 is provided on the wall of the first distribution passage H1a in FIG. 14. Instead, however, the odorant removal portion 550 may be provided on a wall for forming the anode-side passages 121 of each of the separators, or on a wall of the second distribution passage H1b. Alternatively, an additional odorant removal portion may be provided on the wall for forming the anode-side passages 121 of each of the separators, or on the wall of the second distribution passage H1b. In the case where the fuel cell includes a plurality of stacks, the odorant removal portion may be provided in a plurality of branch pipes for distributing the fuel gas to the respective stacks, or in a plurality of branch pipes (see FIG. 9) for gathering the fuel off gas flowing from the respective stacks. Thus, if an odorant that is unlikely to deteriorate output characteristics of the fuel cell is used, the output characteristics of the fuel cell can be inhibited from deteriorating due to the odorant. Thus, a degree of freedom in disposing the odorant removal portion can be enhanced.

In general, an internal fuel gas passage through which a supplied fuel gas flows is formed in a fuel cell, and it is appropriate that an odorant removal portion be provided in the internal fuel gas passage. Thus, leakage of hydrogen gas from the interior of the fuel cell can be sensed. Further, a space for providing the odorant removal portion need not be prepared outside the fuel cell. Therefore, this construction is advantageous in that an existent fuel cell system can be relatively easily substituted for, and in that the fuel cell system can be reduced in size.

In the case where butyric acid is used as the odorant, the odorant removal portion may include a porous adsorbent and a noble metal catalyst, as described in the second modification example of the third embodiment. In this case, it is appropriate that an air blower for supplying the odorant removal portion with oxygen gas be added, and that the odorant removal portion be supplied with oxygen gas during an operation stoppage period (i.e., a power generation stoppage period) of the fuel cell system. Thus, the physically adsorbed odorant can be oxidized (burnt).

The invention is not limited to the aforementioned examples or embodiments and can be implemented in various modes without departing from the gist thereof. For example, the following modifications are possible as well.

(1) In the aforementioned embodiments, the fuel cell system includes the circulating pump 250 and the circulation passage 203. However, the fuel cell system may dispense with the circulating pump 250 and the circulation passage 203.

(2) In the aforementioned embodiments, the fuel gas supply portion 200 includes the gas tank 210 for storing the mixed gas (fuel gas) containing hydrogen gas and the odorant. Instead, however, the fuel gas supply portion 200 may include a gas tank for storing hydrogen gas, and an odorant addition portion for adding an odorant to hydrogen discharged from the gas tank so as to generate the mixed gas (fuel gas). In the case where the fuel gas supply portion includes the odorant addition portion, the fuel gas supply portion may include a hydrogen-occlusion alloy or may be provided with a reformation portion for generating hydrogen gas by reforming alcohol, natural gas, gasoline, ether, aldehyde and the like.

In general, it is appropriate that a fuel gas containing hydrogen gas and an odorant be introduced into the fuel cell.

(3) In the aforementioned embodiments, butyric acid is used as the odorant that is unlikely to deteriorate output characteristics of the fuel cell. Instead, however, diethyl sulfide or the like can also be used.

In the present specification, the odorant that is unlikely to deteriorate output characteristics of the fuel cell refers to an odorant satisfying a condition as mentioned below. First of all, a comparison is made between a first case where the fuel cell is supplied with a fuel gas containing only hydrogen gas and a second case where the fuel cell is supplied with a fuel gas containing hydrogen gas and an odorant. The aforementioned odorant that is unlikely to deteriorate output characteristics of the fuel cell refers to an odorant in which an output current value of the fuel cell in the second case is about 90% or more of an output current value of the fuel cell in the first case. An output current value is measured after the lapse of a power generation period of 24 hours with a predetermined load being connected to the fuel cell and with the fuel cell being supplied with a sufficient amount of the fuel gas and a sufficient amount of the oxidative gas.

(4) In the aforementioned embodiments, the odorant removal portion includes the porous adsorbent that removes the odorant from the mixed gas by physically adsorbing the odorant. Instead, however, the odorant removal portion may include an adsorbent that removes the odorant from the mixed gas by chemically adsorbing the odorant. In the case where the odorant is TBM, it is appropriate that the odorant removal portion include an adsorbent such as ZnO or the like. It is to be noted herein that physical adsorption means adsorption resulting from a Van der Waals force, and that chemical adsorption means adsorption resulting from chemical bonding.

In the aforementioned embodiments, the odorant removal portion adsorbs the odorant. Instead, however, the odorant removal portion may absorb the odorant. In this case as well, the odorant removal portion can remove the odorant from the mixed gas. It is to be noted herein that absorption means a phenomenon of penetration of gas molecules into a liquid or a solid, and that adsorption means a phenomenon of residence of gas molecules in the vicinity of a surface of a liquid or a solid. In particular, a phenomenon of absorption of gas molecules into a solid is referred to as occlusion.

Furthermore, the odorant removal portion may include a reactive agent reacting with the odorant, instead of the adsorbent. In the case where the odorant is butyric acid, it is appropriate that the odorant removal portion include, for example, a pellet containing a basic substance. Calcium hydroxide, aluminum hydroxide or the like can be used as the basic substance.

As described above, the odorant removal portion may include a noble metal catalyst such as Pt or the like in addition to or instead of a porous adsorbent.

In general, it is appropriate that an odorant removal portion be capable of removing an odorant from a mixed gas containing hydrogen gas and the odorant.

(5) In the aforementioned embodiments, the odorant removal portion is provided in the different portions of the fuel cell system. However, the odorant removal portion may be provided somewhere else.

In general, it is appropriate that an odorant removal portion remove an odorant after a fuel gas containing hydrogen gas and the odorant has been introduced into a fuel cell.

(6) Although the aforementioned embodiments deal with cases where the invention is applied to a polymer electrolyte fuel cell, the invention is also applicable to fuel cells of other types.

What is claimed is:

1. A fuel cell system comprising:
a fuel cell;
a fuel gas passage which is connected to the fuel cell and through which a fuel gas containing an odorant and hydrogen gas supplied to the fuel cell flows;
an oxidative gas passage which is connected to the fuel cell and through which an oxidative gas supplied to the fuel cell flows;
a fuel off gas passage which is connected to the fuel cell and through which a fuel off gas discharged from the fuel cell flows;
an oxidative off gas passage which is connected to the fuel cell and through which an oxidative off gas discharged from the fuel cell flows; and
an odorant removal portion which removes the odorant from the fuel gas after introduction of the fuel gas into the fuel cell.

2. The fuel cell system according to claim 1, wherein the odorant is a specific odorant that is unlikely to deteriorate output characteristics of the fuel cell.

3. The fuel cell system according to claim 2, wherein the odorant is butyric acid.

4. The fuel cell system according to claim 2, wherein the odorant removal portion is provided in the fuel off gas passage.

5. The fuel cell system according to claim 4, further comprising:
a circulation passage which couples a first connecting point of the fuel off gas passage to a second connecting point of the fuel gas passage,
wherein
the odorant removal portion is provided in the fuel off gas passage between the first connecting point and the fuel cell.

6. The fuel cell system according to claim 4, further comprising:
a circulation passage which couples a first connecting point of the fuel off gas passage to a second connecting point of the fuel gas passage,
wherein
the odorant removal portion is provided downstream of the first connecting point of the fuel off gas passage.

7. The fuel cell system according to claim 6, further comprising:
an air supply portion which is connected to a third connecting point of the fuel off gas located passage downstream of the first connecting point of the fuel off gas passage and which supplies the fuel off gas passage with air, wherein
the odorant removal portion is provided downstream of the third connecting point of the fuel off gas passage.

8. The fuel cell system according to claim 2, further comprising:
a circulation passage which connects the fuel off gas passage to the fuel gas passage,
wherein
the odorant removal portion is provided in the circulation passage.

9. The fuel cell system according to claim 2, further comprising:
a circulation system which includes a circulation passage connecting the fuel off gas passage to the fuel gas passage and which causes the fuel gas to circulate,
wherein
the odorant removal portion is provided in the circulation system.

10. The fuel cell system according to claim 2, further comprising:
a confluent off gas passage into which the fuel off gas passage and the oxidative off gas passage converge,
wherein
the odorant removal portion is provided in the confluent off gas passage.

11. The fuel cell system according to claim 2, wherein
the fuel off gas passage is connected to the oxidative gas passage,
the odorant removal portion is provided downstream of a connecting point connecting the fuel off gas passage to the oxidative gas passage.

12. The fuel cell system according to claim 11, wherein
an internal fuel gas passage through which a mixed gas of the fuel off gas and the oxidative gas flows is formed inside the fuel cell, and
the odorant removal portion is provided in the internal fuel gas passage.

13. The fuel cell system according to claim 2, wherein
the fuel cell is provided with an electric cell including an anode, a cathode, and an electrolyte membrane sandwiched between the anode and the cathode, and
the odorant removal portion is interposed between the cathode and the electrolyte membrane.

14. The fuel cell system according to claim 1, wherein
an internal fuel gas passage through which the supplied fuel gas flows is formed inside the fuel cell, and
the odorant removal portion is provided in the internal fuel gas passage.

15. The fuel cell system according to claim 14, wherein
the fuel cell is provided with a stack including a plurality of electric cells,
the internal fuel gas passage includes a distribution passage which penetrates the stack and which is designed to distribute the fuel gas to the electric cells respectively, and
the odorant removal portion is provided in the distribution passage.

16. The fuel cell system according to claim 14, wherein
the fuel cell is provided with an electric cell,
the internal fuel gas passage includes a fuel gas small passage which is formed on one face of the electric cell and which is designed to supply the electric cell with the fuel gas, and
the odorant removal portion is provided on said one face of the electric cell where the fuel gas small passage is formed.

17. The fuel cell system according to claim 14, wherein
the fuel cell includes an electric cell which is provided with an anode, a cathode, and an electrolyte membrane sandwiched between the anode and the cathode, and includes a separator which is disposed adjacent to the anode and which forms between itself and the anode a fuel gas small passage through which the fuel gas flows, and
the odorant removal portion is interposed between the anode and the separator.

18. The fuel cell system according to claim 1, further comprising:
an oxygen gas supply portion which supplies the odorant removal portion with oxygen gas,
wherein
the odorant removal portion includes a catalyst which promotes oxidation of the odorant.

19. A fuel cell system comprising:
a fuel cell which is provided with an opening portion and which generates electricity by means of an oxidative gas and hydrogen gas that has been introduced via the opening portion;
a fuel gas passage which is connected to the opening portion of the fuel cell and through which a fuel gas containing hydrogen gas and an odorant is supplied to the fuel cell; and
an odorant removal portion provided downstream of the opening portion.

20. The fuel cell system according to claim 19, further comprising:
a passage which is connected to the fuel cell and through which a fuel off gas discharged from the fuel cell flows,
wherein
the odorant removal portion is provided in the passage.

21. The fuel cell system according to claim 19, wherein
an internal fuel gas passage through which the fuel gas supplied from the opening portion flows is formed inside the fuel cell, and
the odorant removal portion is provided in the internal fuel gas passage.

* * * * *